Dec. 8, 1953  J. SEVERS  2,661,622
ELECTRIC VIBRATION PICK-UP
Filed July 22, 1947
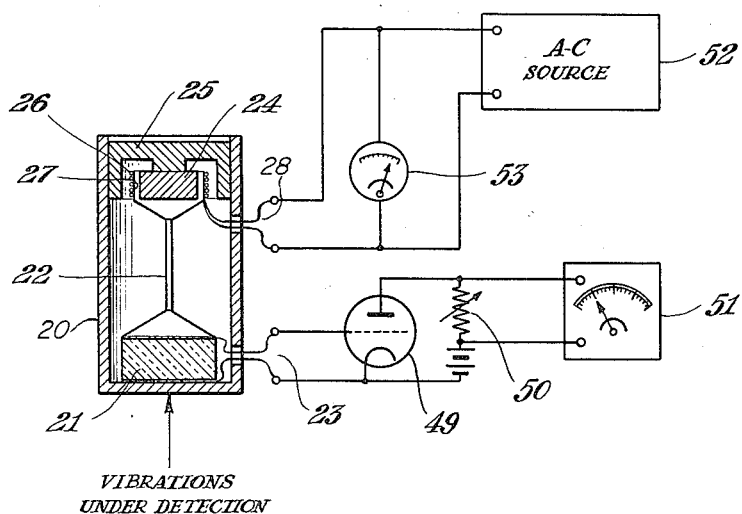
INVENTOR.
JAN SEVERS
BY
ATTORNEY Patented Dec. 8, 1953

2,661,622

UNITED STATES PATENT OFFICE 2,661,622

ELECTRIC VIBRATION PICK-UP

Jan Severs, Eindhoven, Netherlands, assignor to Hartford National Bank and Trust Company, Hartford, Conn., as trustee Application July 22, 1947, Serial No. 762,638

4 Claims. (Cl. 73—70)

The invention relates to an electric vibration pick-up and to devices, and circuit-arrangements in which it is used.

Vibration pick-ups of this kind comprise a mechanically movable system, the movement of which acts upon a mechanico-electrical converting element. This element thus provides an electrical value, generally an electric voltage, which is a measure of the movement of the mechanical system. We distinguish displacement, speed and acceleration pick-ups, the electrical output value of which is proportional to the displacement, the speed and the acceleration respectively of the vibrating object.

Electric vibration pick-ups exhibit many advantages. The electrical values into which the mechanical vibrations are converted may be readily amplified and are eminently suitable for rapid analysis, recording and optical reproduction.

However, in practice, the use of the vibration pick-ups known hitherto involves difficulties. They become manifest by insufficient accuracy of measuring results. These disadvantages will be further described hereinafter.

The invention has for its object to obviate or at least reduce these disadvantages, in order to enhance the accuracy of measurement and therefore proposes an improved form of electric vibration pick-up.

The vibration pick-up according to the invention exhibits the feature that the hitherto conventional mechanico-electrical converting element is arranged in position so as to exert a force produced thereby on the vibratory system. The term "electro-mechanical converting element" is to be understood to mean here an element which upon supply from without of an electrical value produces a force.

If the mechanico-electrical converting element exhibits temperature-dependent sensitiveness, as often occurs, the electro-mechanical converting element is adapted to set the mechanical system vibrating with a known amplitude or at least an amplitude reproducible as to value. By means of the electrical output value produced thereby this permits immediately, and hence under operating conditions of the sensitiveness of the vibration pick-up being determined, checked or, if it is adjustable, adjusted to a desired value. Since in choosing and designing the electro-mechanical converting element it is not necessary to meet the requirements to be satisfied by the mechanico-electrical converting element, such as high sensitiveness, highest possible maximum amplitude, frequency-linear reproduction and the like, there is no difficulty in making sure that errors resulting from variation with temperature and other properties of the electro-mechanical converting element interfering with the above described ascertainment of sensitiveness do not play any part due to suitable choice of type and size. The use of an electro-mechanical converting element of the electro-dynamic type has been found to be particularly advantageous.

It was surprising to find that the described form of electric vibration pick-up is so favourable as to permit of utilizing a crystal of the Seignette-electrical type, such as Seignette salt or Rochelle salt to constitute the mechanico-electrical converting element. Though being very attractive on acount of their high sensitivity, these crystals have hitherto been of no use for precision measurements owing to the capricious way in which their sensitiveness varies with temperature.

The force exerted on the mechanical system by the electro-mechanical converting element of the vibration pick-up according to the invention may also be used to obviate or reduce distortions in reproduction of the vibrations under examination due to unwanted divergences in the frequency characteristic curve. Such divergences always occur with frequencies in the neighbourhood of the natural frequency of the mechanical system. Since, from a structural point of view, it is not always possible to arrange for this natural frequency to be spaced adequately apart from the frequency range under examination, said distortions are of frequent occurrence. They determine first of all the lowest limit of the frequency range under examination, if the natural frequency of the mechanical system lies below it (so-called low-tuned vibration pick-up) and the highest limit of said range, if the natural frequency of the mechanical system exceeds it (so-called high-tuned vibration pick-up). These disadvantages could be obviated, or at least materially reduced, by controlling one of the three forces, viz. mass force, frictional force and resiliency, produced on the mechanical system. If the mass force could be increased or the resiliency decreased, this would have the same effect as if the mass of the mechanical system were increased or its resiliency constant decreased respectively, resulting in turn in a decrease in natural frequency of the mechanical system. The reverse effect (increase of the natural frequency) is also obtainable. It would thus be possible to improve adjustment at will of the natural frequency of the mechanical system over that by structural means alone. An increase in damping force would also have a favourable effect on the frequency characteristic curve.

In the vibration pick-up according to the invention this is made directly possible by causing the desired force to act upon the mechanical vibration system through the electro-mechanical converting element. The electrical value to be supplied for this purpose to the electro-mechanical converting element may be derived in a simple manner from the electrical output value of the mechanico-electrical converting element. The construction according to the invention thus lends itself to use in the manufacture of low- and high-tuned vibration pick-ups suitable for examination of vibrations in a frequency range which is larger or more favourably situated than has hitherto been possible.

In order that the invention may be more clearly understood and readily carried into effect, it will now be explained more fully with reference to the accompanying drawing, in which the single figure illustrates a vibration pick-up circuit in accordance with the invention.

There is shown a high-tuned electric vibration pick-up for absolute movement. Housing 20 encloses a mechanico-electrical converting element 21 which is a piezo-electrical crystal of the Seignette-electrical kind. The mechanical vibration system here comprises the vibrating mass of the said crystal and of the coil 27 and the rigidity of the crystal 21. The vibrations of stud 22 parallel to the axis of the housing and relative thereto are converted by the crystal 21 into an output voltage which can be taken from terminals 23. According to the invention provision is also made of an electro-mechanical converting element of the electro-dynamic kind. A magnet 24 develops, together with the iron circuit 25, a radial homogeneous magnetic field in a gap 26. Movably arranged in this field is the coil 27, which is rigidly secured to the stud 22. The input voltage for this electro-mechanical converting element may be fed to terminals 28. The electro-mechanical converting element permits in a simple manner of ascertaining or checking the sensitivity of the vibration pick-up which, by use of the crystal of the Seignette-electrical type, greatly varies with temperature.

In order to calibrate the detection apparatus to correct for errors resulting, for example, from the effect of temperature on the mechanico-electrical converting element, the electrical output of crystal 21 is fed to an amplifier including an electron discharge tube 49. The output of tube 49, which is developed across anode resistor 50, is applied to a voltmeter 51.

Let us assume that for a certain intensity of vibrations under detection at a given ambient temperature, the crystal sensitivity is such that the voltmeter is deflected to the midpoint on its scale. Since a Seignette or Rochelle salt crystal is somewhat temperature sensitive, a change of ambient temperature with the same intensity of input vibrations will result in a somewhat different reading on the voltmeter, so that if the voltmeter scale is already calibrated in terms of vibration intensity, an incorrect indication would be had. To obviate this disadvantage, the invention provides means to excite the crystal with vibrations having a standard or reference value to permit pre-setting of the meter so that its reading is independent of ambient temperature.

To this end, the dynamic electromechanical converting element constituted by magnet 24 and coil 27 is excited by an alternating current source 52 whose amplitude is adjusted to a desired value by means of a conventional amplitude indicator 53. The dynamic converter then sets up reference vibrations having a fixed amplitude which are applied to the crystal, the reference vibrations being indicated on meter 51.

The calibration is conducted in the following manner:

Let us assume that the ambient temperature during the calibration procedure has a certain value so that for a given setting of resistor 53, the reference vibrations applied to the crystal result in a voltmeter deflection to the midpoint in the scale, and that this scale reading in terms of vibration intensity is correct for the intensity of the reference vibrations. Should the detection apparatus then be used at a time when the ambient temperature is at a different level, it will be found that the same reference vibrations result in a reading off the midpoint. To correct this error, one has merely to adjust the value of resistor 59 so that the meter again provides a midpoint reading, and the apparatus may now be reliably used as a vibration detector.

What I claim is:

1. Vibration detection apparatus comprising a mechanico-electrical converting element for translating vibrations into an electrical wave, means to apply the vibrations to be detected to said element to produce an electrical wave depending on said vibrations, means coupled to said element to measure the electrical output thereof, an electro-mechanical converting member mechanically coupled to said element for imparting force thereto, and an alternating voltage source having a predetermined amplitude, said source being electrically coupled to said member to energize same, whereby said member impresses reference vibrations on said element to enable calibration of the detection apparatus.

2. Apparatus, as set forth in claim 1, wherein said element is constituted by a Seignette crystal.

3. Apparatus, as set forth in claim 1, wherein said member is of the dynamic type.

4. Apparatus, as set forth in claim 3, wherein said dynamic type member includes a magnet and a moving coil positioned for movement in the magnetic field of said magnet and coupled to said element for imparting mechanical force thereto.

JAN SEVERS.

References Cited in the file of this patent

UNITED STATES PATENTS

| Number | Name | Date |
|---|---|---|
| 1,882,396 | Pierce | Oct. 11, 1932 |
| 1,902,184 | Rieber | Mar. 21, 1933 |
| 1,930,905 | Nicholson | Oct. 17, 1933 |
| 2,059,107 | Hinton | Oct. 27, 1936 |
| 2,137,852 | Nicholson | Nov. 22, 1938 |
| 2,289,183 | Ehret et al. | July 7, 1942 |
| 2,320,390 | Shmurak | June 1, 1943 |
| 2,375,004 | Knowles | May 1, 1945 |
| 2,505,601 | Bender, Jr., et al. | Apr. 25, 1950 |
| 2,539,418 | Grogan | Jan. 30, 1951 |